United States Patent [19]

Stich et al.

[11] Patent Number: 4,664,145
[45] Date of Patent: May 12, 1987

[54] DEVICE FOR DELIVERING A PRESSURIZED MEDIUM TO A ROTATABLE PART

[75] Inventors: Bodo Stich, Wiesbaden; Ernst Hassler, Camberg, both of Fed. Rep. of Germany; Ivan J. Cyphelly, Gran Canaria, Spain

[73] Assignee: Glyco Antriebstechnik GmbH, Wiesbaden, Fed. Rep. of Germany

[21] Appl. No.: 805,849

[22] Filed: Dec. 5, 1985

[30] Foreign Application Priority Data

Dec. 8, 1984 [DE] Fed. Rep. of Germany ....... 3444850

[51] Int. Cl.[4] ............................................ F16L 27/00
[52] U.S. Cl. .................................... 137/580; 137/599
[58] Field of Search ................ 137/580, 599; 251/161, 251/175

[56] References Cited

U.S. PATENT DOCUMENTS

| 2,485,692 | 10/1949 | Brill | 137/580 |
| 3,894,558 | 7/1975 | Pederson | 137/580 |
| 3,911,952 | 10/1975 | Sugahara et al. | 137/580 |
| 3,918,486 | 11/1975 | Cyphelly | 137/580 |
| 3,923,133 | 12/1975 | Chivari | 137/580 |

Primary Examiner—A. Michael Chambers
Attorney, Agent, or Firm—Karl F. Ross; Herbert Dubno

[57] ABSTRACT

A liquid feed device for conducting a pressurized medium from a stationary housing to a rotatable component is so constructed that the applied force of a sealing surface of a sliding shoe of the housing on the running surface of the movable structural component is regulated so that on the one hand an effective seal between the sealing surface and the running surface independent of the operating conditions of the system is guaranteed and on the other hand the frictional forces operating are kept as small as possible.

19 Claims, 5 Drawing Figures ated to a device for feeding a pressurized medium from a stationary housing or part to a rotatable component or part, and then to a fluid-utilization unit.

DEVICE FOR DELIVERING A PRESSURIZED MEDIUM TO A ROTATABLE PART

FIELD OF THE INVENTION

Our present invention is related to a device for feeding a pressurized medium from a stationary housing or part to a rotatable component or part, and then to a fluid-utilization unit.

BACKGROUND OF THE INVENTION

A device for feeding a pressurized medium or liquid from a stationary housing to a rotatable structural component cooperating with it generally comprises a valve ring having a running surface formed thereon. This valve ring is provided as a part of or affixed to the rotatable component and has a plurality of valve passages opening onto the running surface, in each of which a nonreturn valve or checkvalve is mounted.

The stationary housing has a shoe communicator with at least one of the nonreturn valves with its sealing surface riding on the running surface of the valve ring, extends only over a portion of the periphery of the valve ring, and is provided in its sliding shoe supported slidably in the housing with an inlet for the pressurized medium and a chamber or compartment for the compressible medium.

A coupler device of this type is described in German Pat. No. DE-PS 24 03 280. Such an apparatus with a hydrostatically discharging sliding shoe is used in hydrostatic devices such as piston pumps and rotary transmission mechanisms for reducing the friction between parts moving relative to each other.

In order to guarantee a secure contact between those parts, this unit basically overcompensates. This means, that, for example, the force applied by a piston on the slidable sliding shoe is chosen to be somewhat greater than the hydraulic separating force occuring between the moving parts. The device, which assumes a definite pressure development in the gap separating the movable parts for an approximately constant balance, operates with no problems at approximately constant rotational speeds and with fluids having a high viscosity (n>20 cSt).

Difficulties, that is, strong deviations from the desired balance, occur particularly with low viscosity media (n<20 cSt) and with different operating conditions, for example, large rotational speed changes of the movable component parts and, particularly, when movable components are accelerated from a stop to their nominal rotational speed in the presence of the input pressurized medium.

OBJECTS OF THE INVENTION

An object of our present invention is to provide a liquid feed device of the above-described kind, in which a control of the applied pressure of the sealing surface of the sliding shoe on the running surface of the movable component parts is of a kind such that on the one hand the seal between the sliding shoe and the running surface is preserved and on the other hand the frictional force between the parts moving against each other is low.

It is a general object of our invention to provide an improved device for conducting a pressurized medium from a stationary housing to a rotatable component which avoids drawbacks of the earlier devices.

It is also an object of our invention to provide an improved coupler apparatus of the above described kind, in which the seal between the sliding surface of the stationary housing and the running surface of the rotatable component is preserved and also the frictional force between the parts is kept low, so that leakage loss can be kept small, while wear and tear on the moving parts is minimized.

It is a further object of our invention to provide an improved coupler apparatus of the above-described kind, in which sealing and frictional forces are balanced, and compensations during operation of this apparatus are satisfactorily preserved under all conditions, even for large rotary speed changes and for low fluid viscosities (n<20 cSt).

It is yet another object of our invention to provide an improved coupler apparatus of the above described kind, in which wear and tear on the moving parts is less than those of earlier systems, while leakage loss is kept low.

SUMMARY OF THE INVENTION

These objects and others which will become more readily apparent hereinafter are attained in accordance with our invention in a coupler apparatus for conducting a pressurized liquid medium from a stationary housing or part to a rotatable component or part comprising a valve ring provided as a part of the rotatable component, wherein the valve ring has a running surface thereon, and and a plurality of valve passages opening onto the running surface with a nonreturn valve or checkvalve (one-way valve) mounted in each of these valve passages.

The stationary housing lies adjacent at least one of the nonreturn valves with a sealing surface thereof on the running surface of the valve ring. The stationary housing extends over a portion of the circumference of the valve ring, and is provided with a sliding shoe supported slidably therein. The sliding shoe contains a plurality of conducting channels for the pressurized medium and a compression chamber bounded by the running surface.

According to our invention a pressurizable liquid feed element conducting member, preferably a conducting piston, for supplying a pressurized medium by the conducting channels therein to the compression chamber, and at least one pressurizable supporting piston or auxiliary element are mounted between the stationary housing and sliding shoe, and a control means responding directly or indirectly to the frictional force between the sliding shoe and the running surface and acted upon by the pressurized medium is provided.

The control means is hydraulically connected with the side of the sliding shoe facing away from the compression chamber, in order to control the applied pressure of the sliding shoe.

The coupler apparatus according to our invention makes possible an automatic adjustment of the frictional force present under different operating conditions between the sealing surface of the sliding shoe and the running surface of the movable structural component or the frictional moments to fit the applied pressure. Thereby in an advantageous way while keeping the leakage loss small, less wear and tear on the assembled parts—particularly during start up—occurs.

Other advantages include the substantial reduction of the difference between the static and sliding friction values during start up under pressure, which allows a problem-free start-up under a full load. The applied force of the pressurized sliding shoe on the sliding surface of the valve ring is sufficiently large that the leakage loss is correspondingly low.

According to a preferred embodiment of our invention at least two conducting passages open onto the running surface of the valve ring and extend between and connect the sealing surface of the sliding shoe and one of a plurality of recesses for shoe cups for mounting the supporting and conducting pistons.

With a greater frictional force, particularly also in starting up from standstill, the pressure developed above the gap separating the sealing surface of the sliding shoe and the running surface of the movable valve ring is not uniform, but falls off steeply at the side acted upon, so that the sliding shoe is acted on by a correspondingly reduced hydraulic applied pressure. In this preferred embodiment the proportionality of the pressure developed in the gap separating the running surface and the sliding surface to the frictional force is used for controlling the applied pressure.

According to this feature of our invention the side of the sliding shoe facing away from the compression chamber is connected with the conducting member, preferably the conducting piston, at each of the supporting pistons adjacent the location where the pressurized medium acts by a restricting passage, and the sliding shoe at least on one side facing in the direction, in which the rotatable structural component rotates, is provided with at least one control valve operable by a lateral housing member rigidly attached to the stationary housing.

The control valve is connected on one side to a restricting passage and on the other side to a discharge conductor, and in such a way that on sliding of the sliding shoe in the direction of rotation, the applied force operating on the sliding shoe is reduced on account of the frictional moments proportionally to the applied pressure.

When, in starting from standstill, the frictional moment is sufficient to take the sliding shoe slightly in the direction of rotation of the rotatable structural component, a reduction of the applied pressure operating on the sliding shoe occurs, so that the applied force of the sliding shoe and thereby the frictional moment is reduced. The control of the applied force occurs here directly by way of the frictional moment.

According to a further feature of our invention the conducting member and the supporting pistons positioned slidably in piston chambers in the stationary housing are constructed as hollow piston members and the hollow piston members each have at least one ball end by which each of the hollow piston members are supported in a shoe cup mounted or formed in the sliding shoe.

Alternatively, the conducting member, cylinder, or piston, and the supporting pistons positioned between the stationary housing and the sliding shoe each comprise an upper and a lower telscoping slidable hollow piston member. Each of the upper hollow piston members is supported in a housing cup mounted in the stationary housing, and each of the lower hollow piston members is supported in a shoe cup mounted in the sliding shoe.

In yet another feature of our invention during a sudden pressure drop of the hydraulic pressure, the applied force of the sliding shoe on the running surface of the valve ring is produced by a spring mounted in each of the hollow pistons, or by a pressurized fluid such as air or an incompressible fluid, such as oil, or by other resilient means such as an elastomer.

According to yet another preferred embodiment of our invention the sealing surface of the sliding shoe is provided on a circumferential bridgelike member. Advantageously, the supporting pistons are interconnected with each other hydraulically by a control oil channel or hydraulically by a restricting passage. A restrictor or throttle may be positioned in the restricting passages and the discharge conductors. The conducting passages may be constructed as capillary tubes.

BRIEF DESCRIPTION OF THE DRAWING

The above and other objects, features, and advantages of our invention will become more readily apparent from the following specific description, reference being made to the accompanying drawing in which.

SPECIFIC DESCRIPTION

Figure 1:
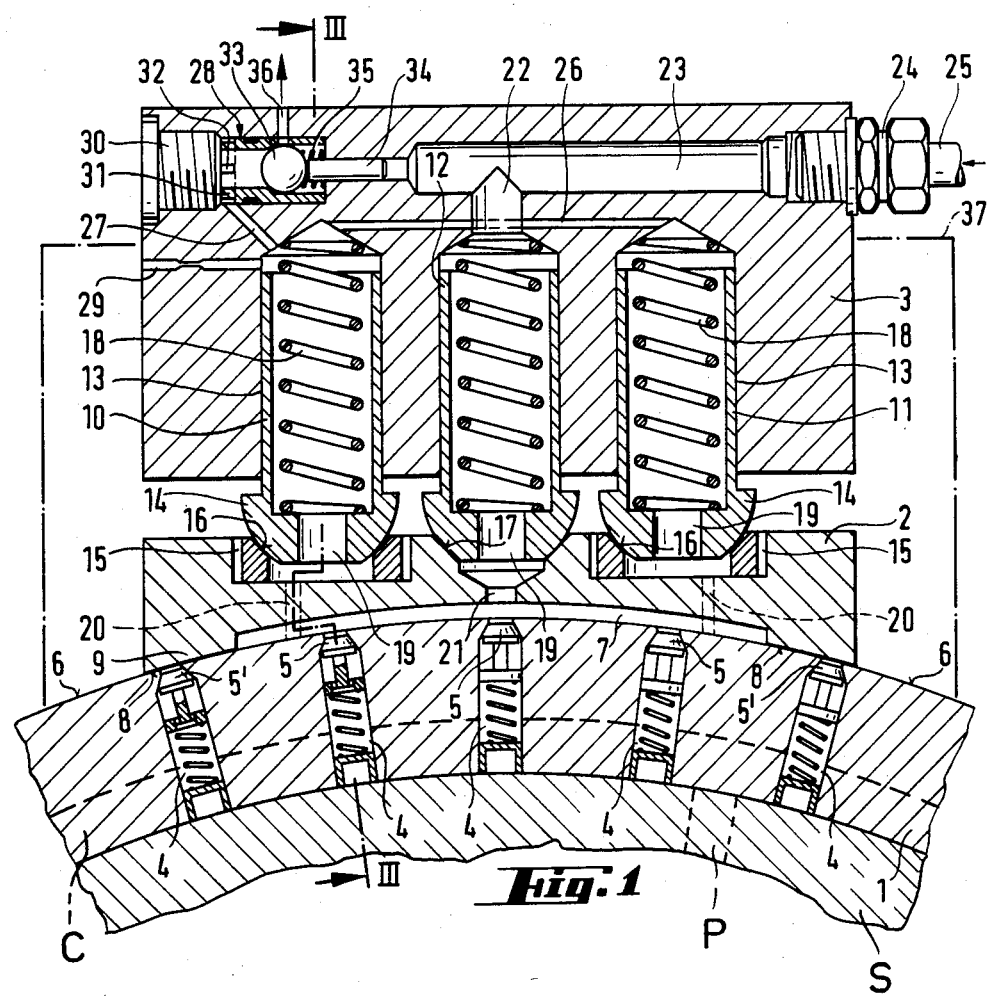
FIG. 1 is a cross sectional view of a first embodiment of the coupler apparatus according to our invention.

As is apparent from FIG. 1, this first embodiment of a conducting apparatus for conducting a pressurized medium from a fixed housing to a rotatable component comprises a valve ring 1, which is attached to a rotatable structural component, for example, a shaft 5, a sliding shoe 2, a housing 3.

Spring-loaded checkvalves 5 and 5' are positioned in radially oriented valve passages 4 distributed uniformly about the circumference of valve ring 1. Only five of these checkvalves 5 and 5' are shown in FIG. 1. The passages for the checkvalves 5 open onto the running surface 6 of the valve ring 1. The passages 4 are usually attached with each other by a circular canal C in the interior of the valve ring 1, which can connect with a shaft passage P.

Figure 2:
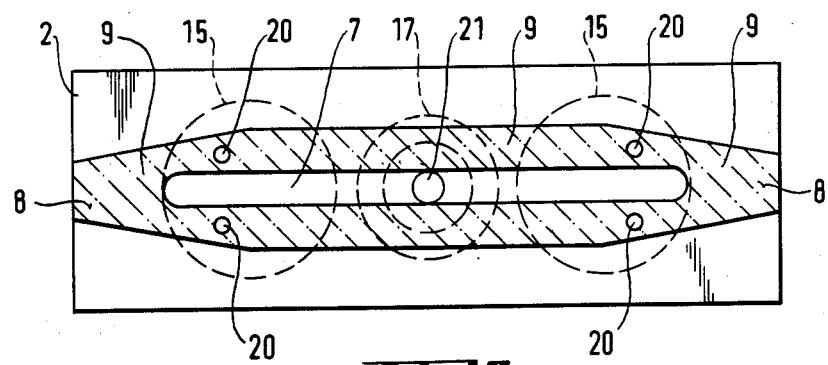
FIG. 2 is a plan view of the bottom of the sliding shoe of the coupler apparatus of FIG. 1 showing the sliding surface and the compression chamber.
Figure 3:
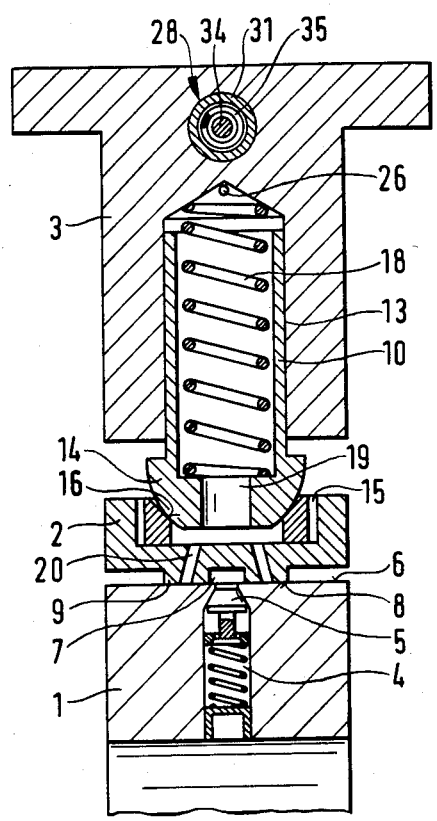
FIG. 3 is a cross sectional view of the conducting apparatus of FIG. 1 taken along the section line III—III of FIG. 1.

As shown in FIGS. 1-3 the sliding shoe 2 is formed with a rectangular cross section and has a centrally positioned groove 7 on its bottom, which extends only partially across the width of the sliding shoe 2.

The groove 7 is referred to in the text below as a compression chamber 7. The sealing of the compression chamber 7 is effected by the contacting of the running surface 6 of the valve ring 1 and the sealing surface 8 of the sliding shoe 2 (see FIGS. 1-3). In order to attain a better seal and reduce friction between the moving parts, the sealing surface 8 is formed on a circumferential bridgelike member 9 (see FIGS. 2 and 3). As is apparent from the drawings of FIG. 1, the length of the sliding shoe 2 or the compression chamber 7 is so determined and selective that three checkvalves 5 are covered by compression chamber 7.

The supporting pistons 10 and 11 and the conducting pistons 12 slidably mounted in piston chambers 13 are each provided with a ball end 14. The ball ends 14 of the supporting pistons 10 and 11 are supported on the movable shoe cups 16 found in the recesses 15 of the sliding shoe 2. This kind of arrangement and structure leads to an increase in the degrees of freedom during operation and also to compensation manufacturing tolerance.

Contrastingly the ball end 14 of the conducting cylinder or piston 12 is directly supported on the sliding shoe 2, in the shoe cup 17 formed as part of sliding shoe 2 and holds the sliding shoe 2 fixed on the running surface 6.

The sliding shoe then, when no hydraulic pressure is present, contacts with the necessary applied pressure the running surface 6, for which purpose springs 18 are positioned in the interior of the supporting pistons 10 and 11 and conducting piston 12.

Instead of the mechanical springs 18, the applied pressure holding sliding shoe 2 to the running surface 6 can also be provided pneumatically, hydraulically, or by an elastomer. Each of the ball ends 14 is—as is apparent from FIG. 1—constructed with an axial ball end passage 19 therein. Between the recess 15 of the sliding shoe 2 and the sealing surface 8, connecting passages 20 are provided.

As has already been mentioned, the input of the pressurized medium into the compression chamber 7 occurs through the conducting piston 12. Therefore the shoe cup 17 has a suitable communicating passage 21 and the piston chamber 13 for conducting piston 12 has a connecting channel 22 for connection to an input passage 23.

The input passage 23 is connected by a joint coupling 24 with the pressurized medium supply tube 25. The piston chamber 13 of the supporting pistons 10 and 11 are connected by the control oil channel 26. The compensating passage 27 connecting the piston chamber 13 of the supporting piston 10 and the compression ratio valve 28 provides for the introduction of control oil into the compression ratio valve 26. A suitable quantity of oil flows to the outside by way of the throttling passage 29 according to the throttling passage cross section and the control pressure.

The compression ratio or proportioning valve 28 is held in the housing 2 by the valve-adjusting screw 30, which lies adjacent to the valve body 31. The compensating passage 27 is so arranged and positioned that the control oil can be admitted to and act on the valve ball 33 through the valve slot 32 positioned in the valve body 31. Between the valve ball 33 and the valve piston 34 a valve spring 35 is positioned. The discharge channel 36 is also shown in FIG. 1. The proportioning valve 28 is so dimensioned, that it then reacts, if the value of the ratio of the pressure in the supporting pistons 10 and 11 and the pressure in the conducting piston 12 exceeds a value which is larger than the value required for operation. The function of the proportioning valve 28 is described in the following description of the operation of the conducting apparatus according to FIGS. 1 to 3:

The pressurized medium is input through the pressurized medium supply tube 25, so that it reaches the conducting piston 12 after flowing through the input passage 23 and the connecting channel 22 between the former and the latter, and further the compression chamber 7 through the ball end axial passage 19 and connecting passages 20. The check-valves 5 covered by the compression chamber 7 are acted upon and opened and the pressurized medium fed through the channel C and passage P in the valve ring 1 to a user apparatus. The valve passage 4 is not registering with the compression chamber 7 opening onto the running surface 6 are closed by the checkvalves 5.

On account of the pressure differences between the compression chamber 7 and the unpressurized leak chamber surrounding the sliding shoe 2, indicated by the dotted line 37, a pressure distribution develops between the running surfaces 6 and the sealing surfaces 8.

Corresponding to this pressure gradient, a separating force is present between the sliding shoe 2 and the valve ring 1, or the surfaces 6 and 8 contacting each other.

To achieve a seal the sum of the supplied forces produced in the pistons 10, 11 and 12 by the springs 18 and the hydraulic pressure must be greater than the separating force produced on account of the pressure in the compression chamber 7 and the forces developed on the sealing bridgelike member 9. On the other hand in order to minimize the wear due to friction between the running surfaces 6 and the sealing surfaces 8, the applied force should only be slightly greater than the separating force.

Figure 4:
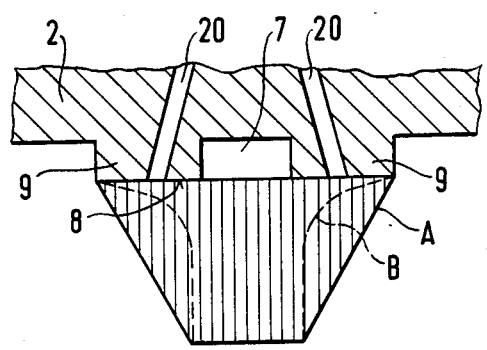
FIG. 4 is a schematic sectional view showing the pressure distribution or characteristic in the gap separating the sliding surfaces of the sliding shoe and the running surface of the rotatable valve ring according to FIG. 3.

According to the operating conditions over the sealing surfaces various pressure distributions occur, which are shown in FIG. 4.

So, for example, in rotation an approximately linear pressure drop A occurs; a pressure distribution on stopping develops which corresponds approximately to the abrupt drop B in the vicinity of the compression chamber 7. This pressure determines directly the hydraulic separating force between the sliding shoe 2 and the valve ring 1, which must be compensated for by the supporting pistons 10 and 11.

Via the connecting passage 20 the pressure in the supporting piston 10 and 11 directly determines the prevailing pressure distribution at the circumferential bridgelike member 9 so that the applied force for the sliding shoe 2 automatically adjusts itself to or matches the separating force. This means that the frictional forces operating in the gap separating the valve ring 1 from the rest of the apparatus are independent of the operating conditions, and thereby the wear and tear on the replacable parts is reduced.

The pressure distribution in this gap changes because of the changing operating conditions, and thus these changes momentarily operate on the pressure in the supporting pistons 10 and 11. This occurs therefore with an automatic fitting of the applied forces to the time varying separating force. As has already been described a proportioning valve 28 is positioned between the input passages 23 for the pressurized medium and the compensating passage 27. The valve ball 33 is put under pressure from one side by the piston 34, this pressure corresponding to the pressure of the pressurized medium fed into the housing 3.

From the other side the valve 33 is put under pressure which corresponds to the prevailing pressure conditions in the supporting pistons 10 and 11. The proportioning valve 28 is therefore—as has already previously been mentioned—so dimensioned, that it operates, if the pressure equilibrium is disturbed, that is when the valve of the pressure ratio of the pressure in the proportioning valve 28 to the pressure in the input passage becomes greater than the required pressure for that functioning. The throttling passage 29 and the proportioning valve 28 serve to improve the dynamics of the system.

Figure 5:
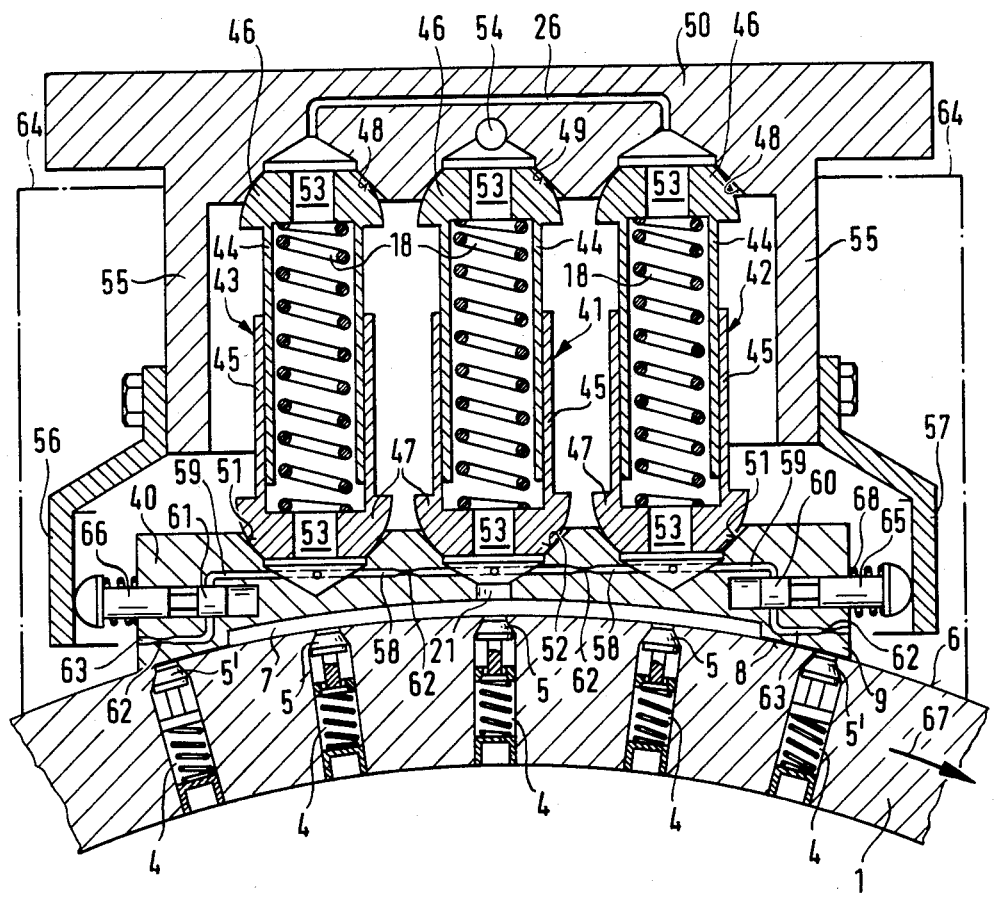
FIG. 5 is a cross sectional view of a second embodiment of the conducting apparatus according to our invention.

The second preferred embodiment of the coupler apparatus for conducting a pressurized medium from a stationary housing to a rotatable structural part has the same basic structure as the embodiment shown in FIG. 1. In FIG. 5 those parts which are the same are provided with the same reference character as in FIG. 1, while those parts which are different are provided with their own reference character.

As in FIG. 1 three spring loaded checkvalves 5 are positioned in valve ring 1, which register with compression chamber 7 of the sliding shoe 40. Sealing surface 8 of the sliding shoe 40 and running surface 6 of the valve ring 1 are shaped to fit and contact each other. The required mechanical applied pressure of the sliding shoe 40, in the absence of hydraulic pressure on the running surface 6 of the valve ring 1, is produced likewise by the springs 18.

The central conducting piston 41 and the supporting pistons 42 and 43 are constructed as hollow pistons fitting and sliding into each other.

As the drawing shows, the upper and lower hollow piston members 44 and 45 have ball ends 46 and 47, which are supported and braced in corresponding housing cups 48 and 49 in the housing 50 and in shoe cups 51 and 52 of the sliding shoe 40.

In order to increase the degrees of freedom of rocking movement between the cups 48, 49, 51 and 52 and the ball ends 46 and 47 a tangential contact only is provided. By these steps a rolling of both supporting elements is allowed and a pivotal or swingable support of the sliding shoe 40 is ensured.

The ball ends 46 and 47 are each constructed with a ball end axial passage 53 therein. The connection of the conducting piston 41 to the compression chamber 7 occurs by the connecting passage 21 and the feeding and pressurized medium into the conducting piston 41 occurs by the supply passage 54. The control oil passage 26 in housing 50 connects the supporting pistons 42 and 43.

As the cross section shown in FIG. 5 shows further, the pistons 41, 42 and 43 as well as the sliding shoe 40 are covered by lateral housing members 56 and 57 which are mounted on the end walls 55 of the housing 50. The cups 51 and 52 are connected by restricting passages 58 with the conducting piston 41. On their other side the cups 51 and 52 and thereby the supporting pistons 42 and 43 are connected by the conductor tube 59 with control valves 60 and 61 so as to be mechanically operable thereby. The outlet of the control valves 60 and 61 leads into the unpressurized leak chamber 64 by way of a discharge conductor 63 provided with a restrictor 62. Each control valve 60 and 61 has a spring-loaded control piston 65 and 66, which is limited in its axial motion by the lateral housing members 56 and 57.

The purpose of the control valve 60 and 61 is described in detail in the following summary of the functioning of the coupler apparatus according to FIG. 5:

The pressurized medium is fed through the supply passage 54, so that it arrives through the upper conducting passage 53 in the conducting piston 41 and further through the conducting passages 53 and 21 into the compression chamber 7. The checkvalves 5 covered by the compression chamber 7 in a way known in the prior art are acted on and unlocked and the pressurized medium is introduced by an unshown circular channel in the valve ring 1 to a user device. The valve passages 4 opening onto the running surfaces 6 outside of the compression chamber 7 are closed by the checkvalves 5. Extending from the compression chamber 7 the supporting pistons 42 and 43 are acted on by the control oil and/or the pressurized medium by way of the communicating passage 21 and the restricting passage 58.

Also in this system the separating forces corresponding to pressure development between the sealing surfaces 8 of the sliding shoe 40 and the running surface 6 of the valve ring 1 occurs.

For reduction of the frictional forces and thereby the wear between the surfaces 6 and 8, in this embodiment the control of the applied pressure in the control valves 60 and 61 is effected directly by way of the frictional moment. The system is so dimensioned that with equal pressure in the supporting pistons 42 and 43, and in the conducting pistons 41 also with an undesirable pressure distribution in the gap separating the surfaces 4 and 6, that is, with possibly enlarged separating forces a safe sealing and/or mounting of the sliding shoe 40 on the valve ring 1 is guaranteed. If the controlling pressure always corresponds to the system pressure, the applied force with varying separating forces could lead to impermissible friction values with a correspondingly high degree of wear.

Upon rotation of the valve ring 1 in the direction of the arrow 67 naturally on account of the frictional forces present between the running surface 6 and the sealing surface 8 the sliding shoe 4 likewise is pushed or moves in the direction of arrow 67.

This motion is transmitted by the fixed lateral housing members 57 to the spring-loaded control piston 65 of the control valve 60. The control valve 60 thus opens, so that the control oil can flow away through the restrictor 62 by way of the discharge conductor 63, which leads to a reduction of the applied pressure. The mechanical return movement of the sliding shoe 40 occurs by the spring 68 of the control valve 60. The sliding shoe 40 takes then an equilibrium position in regard to the frictional moment and the returning force of the spring 68. With a reversal of the rotatational direction of the valve ring 1 the frictional moment proportional control is effected by the control valve 61 in connection with the lateral housing members 56.

The coupler apparatus of our invention for conducting a pressurized medium from a stationary housing to a rotatable structural part is not however limited to the particular embodiment shown in FIGS. 1 to 5. Thus, for example, also the valve ring 1 can be stationary and the sliding shoe 6 or 40 can move on the sealing surface 7 of the valve ring 1. It is, however, also possible to arrange the sliding shoe 6 or 40 in the inside of the valve ring 1. Likewise an axial sliding shoe arrangement is also possible.

We claim:

1. In a liquid feed device for conducting a pressurized medium from a stationary housing to a rotatable component provided with a valve ring having a running surface fixed thereon, said valve ring having a plurality of valve passages opening onto said running surface, and in each of said valve passages a checkvalve, wherein said stationary housing lies adjacent at least one of said checkvalves with a sealing surface of said stationary housing on said running surface of said valve ring, said stationary housing extending over a portion of the circumference of said valve ring, and being provided with a sliding shoe supported slidably in said stationary housing, said sliding shoe containing at least one conducting channel for said pressurized medium and a compression chamber bounded by said running surface, the improvement wherein a pressurizable conducting member for supplying said pressurized medium by said conducting channel to said compression chamber and at least one pressurizable supporting piston are positioned between said stationary housing and said sliding shoe, and a control means responding to frictional force between said sliding shoe and said running surface and acted upon by said pressurized medium is provided, said control means being hydraulically connected with a side of said sliding shoe facing away from said compression chamber, in order to control applied pressure of said sliding shoe against said ring.

2. The improvement according to claim 1 wherein at least two conducting passages are formed in said sliding shoe, said conducting passages opening onto said running surface of said valve ring and extending between and connecting said sealing surface of said sliding shoe and one of a plurality of recesses formed in said sliding shoe for shoe cups for mounting said supporting piston and said conducting member, so that said sliding shoe according to the pressure of the pressurized medium present in a gap separating said sealing surface of said sliding shoe and said running surface of said valve ring is pressed to said running surface.

3. The improvement according to claim 2 wherein said conducting passages are constructed as capillary tubes.

4. The improvement according to claim 1 wherein the side of said sliding shoe facing away from said compression chamber is connected with said conducting member adjacent the location on each of said supporting pistons where said pressurized medium acts by a restricting passage, and said sliding shoe at least on the side facing in the direction, in which said rotatable structural component rotates, is provided with at least one control valve, a part of said control means, operable by a lateral housing member rigidly attached to said stationary housing, said control valve being connected on one side to said restricting passage and on another side to a discharge conductor, and so that on sliding of said sliding shoe in said direction of rotation, the applied force operating on said sliding shoe is reduced on account of the frictional moments proportionally to said applied pressure.

5. The improvement according to claim 4 wherein in said restricting passage and said discharge conductor a throttle is positioned.

6. The improvement according to claim 1 wherein said conducting member and each of said supporting pistons are positioned slidably in a piston chamber in said stationary housing and are constructed as a hollow piston member and said hollow piston members each have at least one ball end by which each of said hollow piston members are supported in a shoe cup mounted in said sliding shoe.

7. The improvement according to claim 1 wherein said conducting member and each of said supporting pistons are positioned between said stationary housing and said sliding shoe and comprise an upper and a lower telescoping slidable hollow piston member, wherein each of said upper hollow piston members is supported in a housing cup mounted in said stationary housing, and each of said lower hollow piston members is supported in a shoe cup mounted in said sliding shoe.

8. The improvement according to claim 7 further comprising a spring mounted in each of said hollow piston members, said spring applying a force to said sliding shoe which in turn presses said running surface of said valve ring, said application of force arising during a sudden pressure drop in the pressure of said pressurized medium.

9. The improvement according to claim 1 wherein said sealing surface of said sliding shoe is provided on a circumferential bridgelike member.

10. The improvement according to claim 1 wherein said supporting pistons are interconnected with each other hydraulically by a control oil channel.

11. The improvement according to claim 1 wherein said supporting pistons are interconnected with each other hydraulically by a restricting passage.

12. A device for feeding a liquid under pressure from a stationary part to a rotating part, said device comprising:
 a ring connected to said one of said parts and formed with a multiplicity of angularly equispaced checkvalves opening at a running surface along a periphery of said ring and communicating with said one of said parts;
 a shoe carried by the other of said parts and riding on said surface, said shoe having a pressure compartment registering successively with said checkvalves upon rotation of said ring relative to said shoe;
 a liquid-feed pressing element biased with prestress by a spring against said shoe and engaging said shoe so that said shoe can rock relative to said liquid-feed pressing element, said liquid feed pressing element being formed with a passage communicating with said compartment;
 at least one auxiliary pressing element biased with prestress by a spring against said shoe and spaced from said liquid-feed pressing element; and
 hydraulic means responsive to a force with which said shoe bears upon said ring for automatically and hydraulically regulating the pressure of said auxiliary element against said shoe to maintain a predetermined minimum degree of contact pressure between said shoe and said ring.

13. The device defined in claim 12 wherein said liquid-feed pressing element is flanked by two of said auxiliary elements, all of said elements include pistons bearing upon said shoe with limited freedom of rocking movement and lie generally in a common plane perpendicular to an axis of said rotating part and in which said checkvalves are disposed.

14. The device defined in claim 13 wherein each of said pistons is biased toward said shoe by a respective compression coil spring received within the respective piston.

15. The device defined in claim 14, further comprising means hydraulically connecting interiors of said auxiliary pistons with one another to equalize hydraulic pressure therebetween, said auxiliary pistons being open toward said shoe and receiving fluid under pressure therefrom reflecting hydraulic pressure in said compartment.

16. The device defined in claim 15 wherein said hydraulic means includes a throttled passage communicating with the interior of at least one of said auxiliary elements and discharging fluid therefrom.

17. The device defined in claim 16, further comprising means for feeding said liquid under pressure to said liquid-feed pressing element, said hydraulic means further including a valve biased by said liquid under pressure in one direction and biased by hydraulic fluid from said auxiliary elements in an opposite direction.

18. The device defined in claim 16 wherein each of said pistons has a rounded head engaging tangentially respective flanks of seats formed on said shoe.

19. The device defined in claim 18 wherein said seats are interconnected by a passage forming part of said hydraulic means and depressurized in response to excess entrainment force on said shoe in a given direction.

* * * * *